US008707407B2

(12) United States Patent
Craddock et al.

(10) Patent No.: US 8,707,407 B2
(45) Date of Patent: Apr. 22, 2014

(54) ACCOUNT HIJACKING COUNTER-MEASURES

(75) Inventors: Richard S. Craddock, San Francisco, CA (US); Krishna C. Vitaldevara, Fremont, CA (US)

(73) Assignee: Microsoft Corporation, Redmond, WA (US)

( * ) Notice: Subject to any disclaimer, the term of this patent is extended or adjusted under 35 U.S.C. 154(b) by 771 days.

(21) Appl. No.: 12/365,575

(22) Filed: Feb. 4, 2009

(65) Prior Publication Data

US 2010/0199338 A1  Aug. 5, 2010

(51) Int. Cl.
*G06F 7/04* (2006.01)

(52) U.S. Cl.
USPC .................. 726/7; 726/21; 726/26; 713/168; 713/182

(58) Field of Classification Search
None
See application file for complete search history.

(56) References Cited

U.S. PATENT DOCUMENTS

| | | | |
|---|---|---|---|
| 7,231,657 B2 * | 6/2007 | Honarvar et al. | 726/2 |
| 7,778,926 B1 * | 8/2010 | Grinchenko et al. | 705/50 |
| 2003/0236995 A1 | 12/2003 | Fretwell, Jr. | |
| 2004/0177120 A1 * | 9/2004 | Kirsch | 709/206 |
| 2007/0038568 A1 * | 2/2007 | Greene et al. | 705/50 |
| 2007/0101010 A1 * | 5/2007 | Ellison et al. | 709/229 |
| 2007/0136573 A1 * | 6/2007 | Steinberg | 713/155 |
| 2007/0234409 A1 | 10/2007 | Eisen | |
| 2007/0239604 A1 | 10/2007 | O'Connell et al. | |
| 2007/0250920 A1 | 10/2007 | Lindsay | |
| 2008/0120688 A1 | 5/2008 | Qiu et al. | |
| 2009/0030813 A1 * | 1/2009 | Wiesehuegel et al. | 705/27 |
| 2010/0122340 A1 * | 5/2010 | Chow et al. | 726/18 |

OTHER PUBLICATIONS

Federal Deposit Insurance Corporation, "Putting an End to Account-HiJacking Identity Theft", Dec. 14, 2004, http://www.fdic.gov/consumers/consumer/idtheftstudy/identity_theft.pdf.

Einav, Yohai, "Why 'Red Flags' Would Work", Online Identity and Trust, VeriSign, Nov. 12, 2008, http://blogs.verisign.com/identity/fraud_detection/.

Meier, et al, "Improving Web Applications Security: Threats and Countermeasures", Microsoft Corporation, Improving .NET Application Performance and Scalability, Chapter 2—Threats and Countermeasures, Jun. 2003.

Casarella et al., "Identity Theft", Pace University's School of Computer Science and Information Systems, Apr. 8, 2006, http://66.102.1.104/scholar?hl=en&lr=&q=cache:kp_3LfSXMyEJ:dps.csis.pace.edu:8077/files/team2/presentation/Identity_Theft_Project_Master_04-08Final.doc+detect+account+hijacking+unusual+activity.

Emigh, et al., "Phishing: Technology, Chokepoints and Countermeasures", http://www.radixlabs.com/idtheft/overview.pdf 42 pages, published by at least Oct. 3, 2005.

* cited by examiner

*Primary Examiner* — Shewaye Gelagay

(74) *Attorney, Agent, or Firm* — Bryan Webster; Sade Fashokun; Micky Minhas

(57) ABSTRACT

A method for providing an additional layer of authentication prior to accessing a user's account even though the user's credentials have previously been verified. User accounts are often accessed via a sign-in page that verifies the user's credentials. Upon detecting a device accessing the sign-in page, an identifier associated with the device is obtained. One such type of identifier is the IP address assigned to the device. Based on the identifier, it is determined whether the device is trusted or not. Even thought the user's credentials are verified via the sign-in page, if the device is not trusted, a second authentication page is presented to the user prior to proceeding to the account. The second authentication page presents at least one security question. The security question is based on information contained in the user's account (e.g., contact information, event information, electronic messages, etc.). The user is required to correctly answer the security question in order to access the account.

11 Claims, 12 Drawing Sheets

ACCOUNT HIJACKING COUNTER-MEASURES

BACKGROUND

A single sign-on (SSO) service provides a method of access control that enables a user to log in once and gain access to the resources of multiple systems and/or applications without being prompted to log in again. The initial log-in process typically includes a sign-on webpage that prompts the user for their credentials (e.g., username (user ID) and password). Upon entering the correct credentials, the user is authenticated and is taken to a home landing page. The landing page is either a default page set by the service or a page designated by the user during account registration. Once at the home landing page, the user may access additional services and/or applications associated with their user ID such as email accounts, an address book, Groups, messenger applications, calendars, and the like.

User accounts are subject to account hijacking through a variety of techniques. Some of the most common ways of illegally entering a user's account are by guessing the user's password (commonly referred to as a "brute force attack"), acquiring the user's password through social engineering (e.g., convincing technical support to provide a password reset to a different account) and acquiring the user's user ID and password through a computer infected with malware (e.g., a keylogger). If a user's credentials are obtained by an unauthorized third-party, the third party can log-in to the user's account and access all of the user's data contained in the account. The third party can copy the user's data, erase the user's data, and so on.

SUMMARY

One aspect of the present technology is to provide an additional layer of authentication prior to accessing a user's account even though the user's credentials (e.g., password and user ID) have previously been verified. User accounts are often accessed via a sign-in page that verifies the user's credentials. Upon detecting a device accessing the sign-in page, an identifier associated with the device is obtained. One such type of identifier is the IP address assigned to the device. Alternatively, an identifier may include a device ID, subnet of the IP address and/or geographical location. Based on the identifier, it is determined whether the device is know or suspicious. If the device is unknown or suspicious, a second authentication page is presented to the user prior to proceeding to the account even though the user's credentials have previously been verified via the sign-in page. The second authentication page presents at least one security question. The security question is based on information contained in the user's account (e.g., contact information, event information, electronic messages, etc.). The user is required to correctly answer the security question in order to access the account.

A security question may be based on information contained in the user's account. By using information contained in the user's account, answering the question should be trivial for the actual usual, while at the same time, difficult to answer for anyone else. Any information accessible in the user's account may be used as the basis for a security question. By way of example only, such information includes contact information in an address book, event information in a calendar, sent emails in a mail account, received emails in a mail account, Group affiliations, account activity, digital images, blog pages, profile information, and so on.

One aspect of the present technology is to provide a method for authenticating a user prior to providing access to the user's landing page. When the user's sign-in page is accessed, an identifier (e.g., IP address) associated with the device accessing the sign-in page is obtained. The device is designated as a known device or as an unknown device based on the device identifier. If the identity of the device is unknown, at least one security question is generated based on account activity associated with the user's account. Account activity data that may be used for the security question includes, but is not limited to, method of logging into the account (e.g., via web, via mobile device, etc.), messenger status message, and the like. Each security question must be correctly answered in order to proceed to the user's landing page.

In one aspect, the second layer of authentication prompts a user to provide a certain type of information and verifies whether the information is contained in the account. In one embodiment, the user is requested to provide at least one contact name that exists in the user's address book. Upon receiving the contact name, the address book associated with the user ID is accessed and the full_name field of each contact is searched for the contact name provided by the user. If the contact name provided by the user is not identified, the user is denied access to the account. Alternatively, the technology can identify other users that the user communicates with (e.g., friends, family, etc.), and use this information as the basis of a security question. In another embodiment, the user is requested to provide at least one calendar item contained in their calendar. If the calendar event provided by the user is not located in the calendar, the user is denied access to the account. In yet another embodiment, the user is requested to provide at least one subject line from an email recently sent by the user. The sent folder in the user's mail account is accessed and the subject_field of each email header in the account is searched. If the subject line provided by the user is not identified in a subject_field, the user is denied access to the account.

In another aspect, the second layer of authentication provides a security question containing both information from the user's account and fictitious information. The security question requires the user to verify which information from the user's account. In one embodiment, the contact name from a full_name field of a contact in the user's account is obtained and displayed to the user along with at least one fictitious name. The user is requested to select the contact name that exists in the user's address book. If the user does not select the correct contact name, or selects a fictitious name, the user is denied access to the account. In another embodiment, the user's calendar is accessed and event information is obtained. The obtained event information, along with fictitious event information, is displayed to the user. If the user does not select the event information from his calendar or selects a fictitious event, the user is denied access to the account. In yet another embodiment, a sent folder in the user's mail account is accessed. A recipient address is obtained from the TO: field of a header of an email recently sent by the user. At least one fictitious recipient address is also generated and displayed. If the user does not select the correct recipient address or selects a fictitious recipient address, the user is denied access to the account.

DETAILED DESCRIPTION

The technology described herein requires a user to authenticate a second time before accessing their landing page even though the user has previously been successfully by verified their credentials. The second authentication process presents one or more security questions to the user. The security questions are based on randomly selected information from the user's account (e.g., contacts in address book, calendar items, sent email, received email, etc.). Therefore, it will be extremely difficult for an account hijacker to provide the correct answers to the security questions. Yet, at the same time, it should be trivial for the user to correctly answer the security questions.

Figure 1:
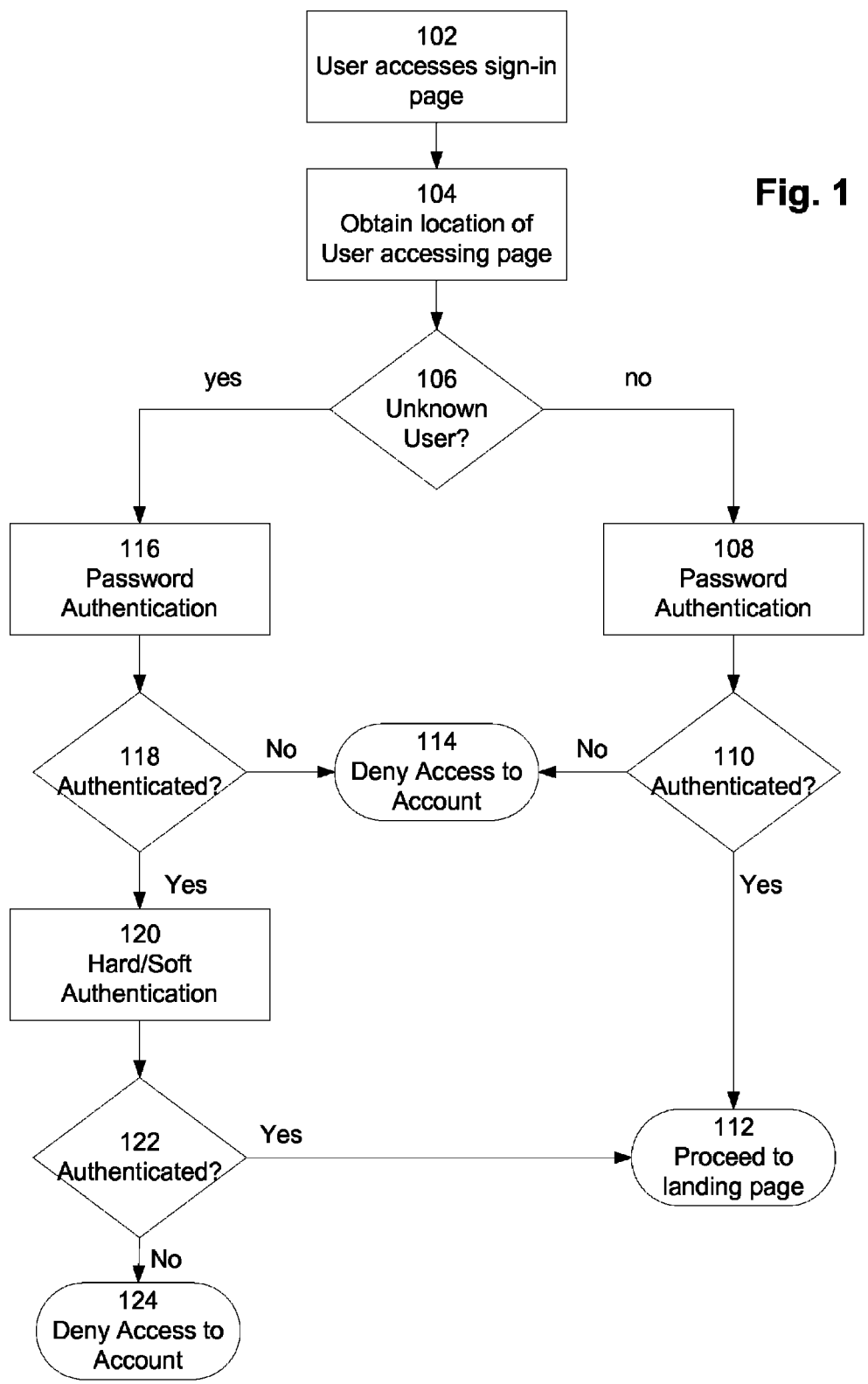
FIG. 1 depicts a flow diagram illustrating exemplary steps for authenticating a user.

The technology described herein will now be described with reference to FIGS. 1-12. FIG. 1 illustrates exemplary steps for authenticating a user. In step 102, the sign-in page to a user's account is accessed. For the purpose of describing the technology herein only, the sign-in page requests the user's credentials. In step 104, the location of the device accessing the sign-in page is obtained. The location of the device may be determined by several different types of information such as, but not limited to, the Internet Protocol (IP) address assigned to the device participating in the network (e.g., LAN, WAN, etc.). The technology described herein recognizes an IP address formatted in both IP version 4 (IPv4) and/or IP version 6 (IPv6). IPv4 and IPv6 are well known within the computer science art and therefore, do not require further description herein. In IPv4 installations, the location of the device could also be expressed as a subnet mask. The location of the device may also be determined by a device ID, geographical location of the device (e.g., city, state, country, etc.), Autonomous System Number, and the like. For the purpose of describing the technology herein only, the location of the device is the IP address assigned to the device.

Figure 2:
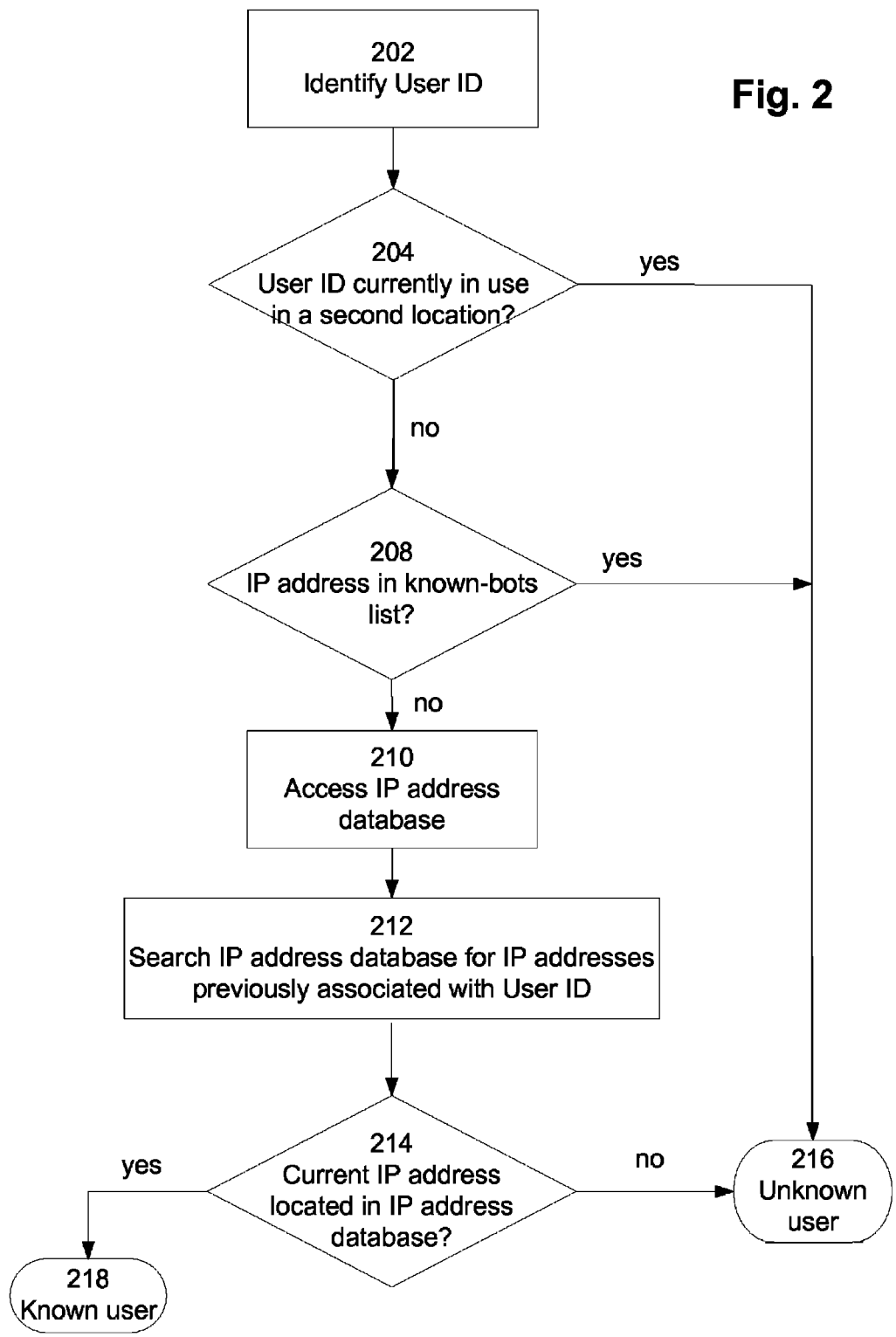
FIG. 2 depicts a flow diagram illustrating exemplary steps for identifying a user.

In step 106, it is determined whether the identity of the device is known or unknown. FIG. 2 provides additional description of determining whether a device is known or unknown. If the identity of the device is known, the user is prompted to enter their credentials, in step 108. Alternatively, a user may be promoted to enter their credentials immediately after the user accesses the sign-in page at step 102. In general, a user's credentials include a user ID and password. By way of example only, a user ID may include an email address, a username. Upon a user entering their credentials in the sign-in page, it is determined whether the user entered the correct credentials and should be authenticated, in step 110. If the user is authenticated in step 110, the user is directed to their landing page, in step 112. The user's landing page is, by way of example only, a webpage designated by the user upon registration of the account. If the user is not authenticated in step 110, access to the account is denied, in step 114.

If, in step 106, it is determined that the identity of the device is unknown or suspicious (also referred to as a trusted device or not trusted device), the user will be required to provide at least one additional level of authentication beyond the conventional username/password before proceeding to the account's landing page. As will be described in more detail later, the two authentication processes are preferably based on different information associated with the account in order to make it more difficult for unauthorized access to the account. As shown in FIG. 2, the second authentication process (step 120) that is required only when the identity of the device is unknown or suspicious.

In step 116, the user is asked to enter their credentials (user ID and password) to authenticate their identity. Again, the user may be requested to enter their credentials immediately after accessing the sign-in page at step 102. In that instance, step 106 occurs after the user enters their credentials. In step 118, it is determined whether the user is authenticated. If the user did not enter the correct credentials in step 116, the user is denied access to the landing page associated with the user ID, in step 114. If the user entered the correct credentials, the method proceeds to step 120. Even though the user has entered the correct credentials, the user is required to authenticate their identity a second time because the identity of the device was not known or verified (step 106). Because the identity of the device is unknown, the system is suspicious that an unauthorized third-party is attempting to access the user's account. As will be discussed in more detail later, the second authentication (step 120) is based on any information contained in the user's account or on account activity (see system 800 in FIG. 8) that should be trivial for the user to identify yet difficult for a third-party to identify.

In step 120, the user is required to authenticate themselves a second time. FIG. 1 illustrates that the second authentication process may comprise a soft authentication process or a hard authentication process. The soft authentication process and hard authentication process will be described in more detail later in the application. In step 122, it is determined whether the user is authenticated based on the user's response to the soft/hard authentication process. If the user did not properly authenticate, access to the account associated with the user ID is denied, in step 124. If the user properly authenticated, the user is directed to the landing page associated with the user ID, in step 112.

FIG. 2 illustrates exemplary steps for determining whether the identity of the device is known or unknown (step 106 in FIG. 1). In step 202, the user ID is identified. If the user saved their user ID on device (e.g., by selecting a "remember me" option on the sign-in page), the user will not have to retype their user ID the next time the user accesses the sign-in page.

In this case, the user ID can be obtained upon accessing the sign-in page, in step 202. If the user did not select the "remember me" option or is accessing the sign-in page from a device the user has not used before (e.g., friend's computer, public computer, etc.), the user ID is identified in step 202 when the user ID is entered in the sign-in page. For the purpose of describing the technology herein only, suppose the user ID identified in step 202 is "joe@example.com". As described above with regard to FIG. 1, the IP address assigned to the device accessing the sign-in page has been obtained (step 104).

In step 204, it is determined whether the user ID is currently in use in another location. Using the example whereby the user location is identified by an IP address, it is determined whether the user ID is currently associated with another IP address (other than the IP address obtained in step 104). If another IP address is detected in step 204, it may indicate that more than one device is attempting to access the same user account, the user account is already in use, and so on. It is not often that a user accesses their account via more than one device at the same time. Thus, detecting two different IP addresses associated with a single user ID likely means that an unauthorized device is attempting to gain access to the user's account or has accessed the user's account. This suspicious behavior (two devices accessing a single account) triggers an unknown response, in step 216. If only a single IP address is identified, the method proceeds to step 208.

In step 208, it is determined whether the IP address (obtained in step 104) is associated with a known bot. Bots are software applications that run automated tasks over the Internet, and are often associated with automated attack on networked computers. In one embodiment, a bot database (not shown) is maintained that stores IP addresses known to be associated with a bot. If the IP address obtained in step 104 is located in the bot database, the device accessing the sign-in page is designated as unknown, in step 216. If the IP address obtained in step 104 is not located in the bot database, the method proceeds to step 210.

In step 210, an IP address database is accessed. The IP address database contains trusted IP addresses that have been previously associated with various user IDs. Users routinely access their sign-in page via multiple devices, such as a home computer, a work computer, and a mobile device. When a user accesses their sign-in page, the IP address assigned to the device accessing the sign-in page is stored in the IP address database (not shown) upon successful sign in. The IP address is stored in the database in association with the user ID.

In step 212, the IP address database is searched for the IP address assigned to the device currently accessing the sign-in page (step 104). Again, the search in the database is specific to the user ID associated with the account. Using the example provided above, the database is search for IP addresses stored in association with the user ID joe@example.com.

In step 214, it is determined whether the IP address (obtained in step 104) is located in the IP address database under the user ID joe@example.com. If the IP address has been previously associated with the user ID, the identity of the device is known, in step 218. If the IP address has not been previously associated with the user ID, the identity of the device is unknown or suspicious, in step 216. Other heuristics could be used to determine whether a device should be designated as known or unknown. By way of example only, the time the user's sign-in page is being accessed could be used to designate the device as known or unknown. If, for example, the user's sign-in page is typically accessed between 8 am and 11 pm, and the user's sign-in page is currently being accessed at 3 am, the device may be designated as unknown. The geographical location of the device accessing the sign-in page (e.g., city, state, country) could also be used to designate the device as known or unknown. If, for example, the IP address of the device accessing the user's sign-in page indicates the device is located in France and the user's sign-in page has never been accessed outside of the United States, the device would be designated as unknown. Similarly, the mode of accessing the sign-in page may be used to designate a device as known or unknown. If a user's sign-in page has never been accessed via a mobile device, a mobile device accessing the sign-in page for the first time may automatically be designated as unknown. These heuristics are provided as examples only, and are not intended to limit the scope of the technology described herein.

Figure 10:
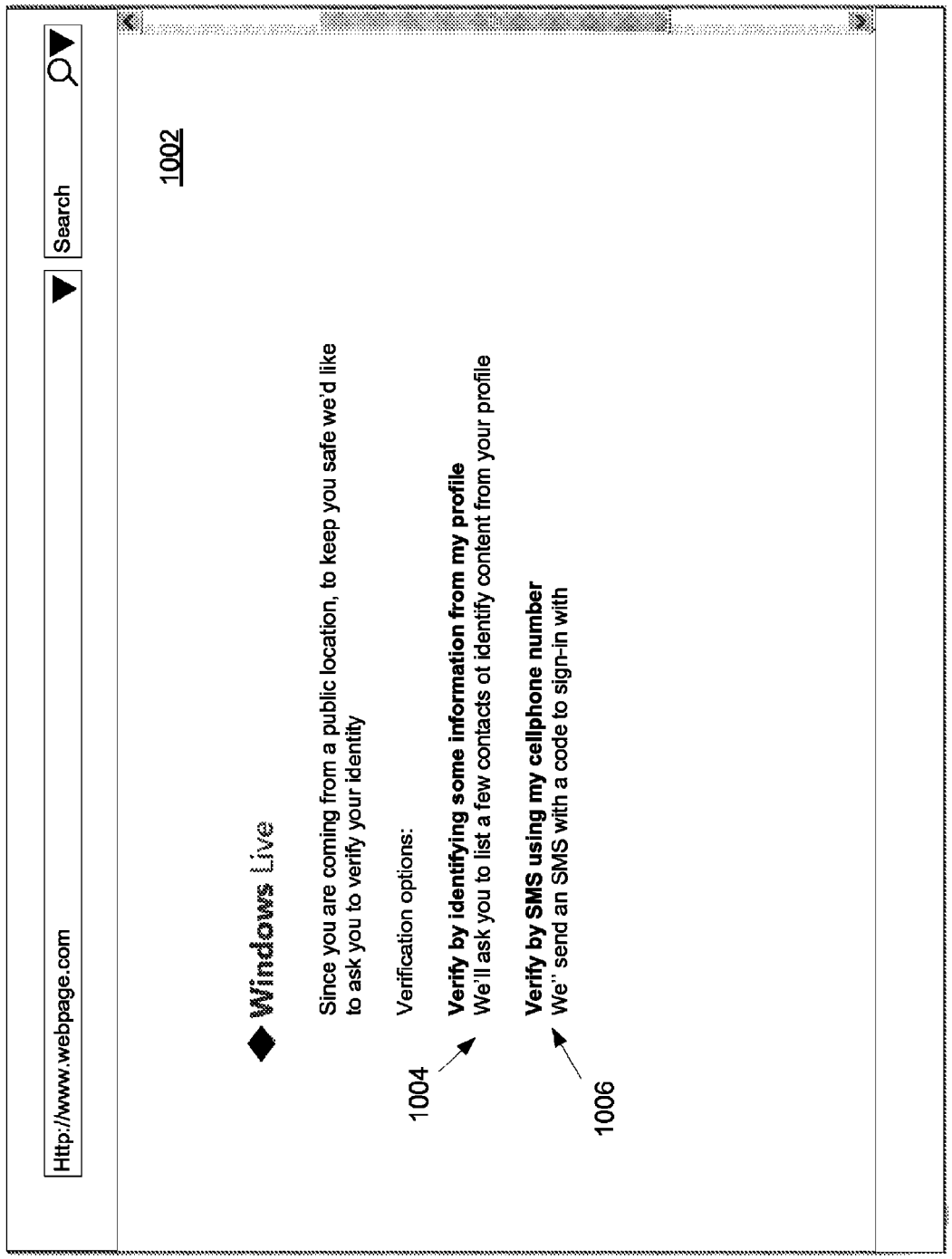
FIG. 10 illustrates an exemplary screen shot of an initial authentication interface.
Figure 11:
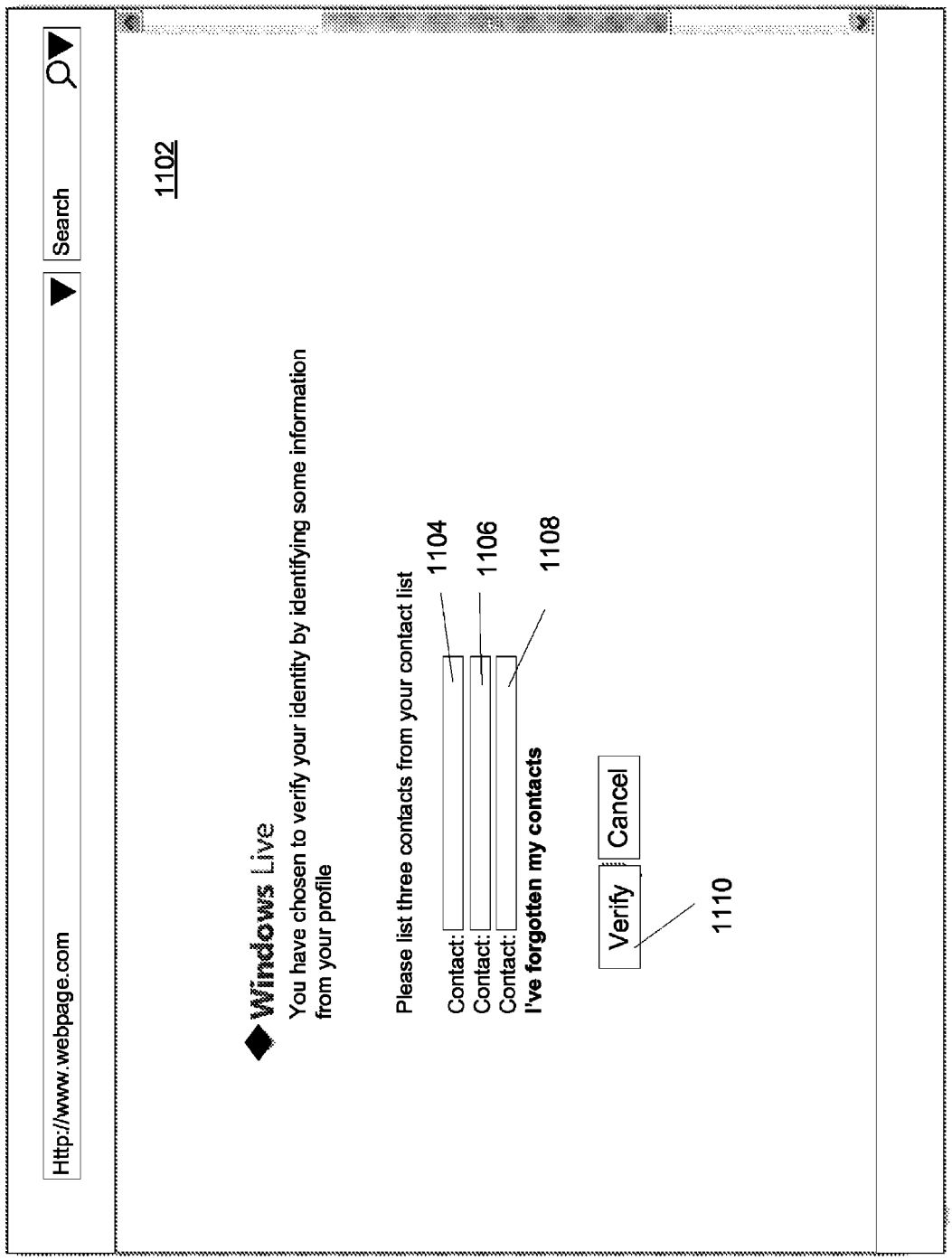
FIG. 11 illustrates an exemplary screen shot of a soft authentication interface requesting the user to enter contact names.

The second authentication process (step 120 in FIG. 1) may be a soft authentication factor or a hard authentication process (commonly referred to as "two-factor authentication"). FIG. 10 illustrates an exemplary authentication UI 1000 that the user may be presented with after the user's credentials are verified. Soft authentication generally refers to a process of authenticating a user via at least one security question that is based on personal information (e.g., contact information, sent email, received email, calendar information, group affiliations, most recently added contacts, etc.) and/or account activity (e.g., connection locations, etc.) associated with the user's account. Hard authentication generally refers to a process of authenticating a user whereby a code or password is sent to a device registered with the user's account (e.g., send email with access code to registered email address, send a text message to a registered mobile device with access code, etc.). Upon receiving the code, the user repeats it back to system before being allowed to proceed to the landing page. Many different hard authentication processes are known within the art today and therefore, are not described in further details herein.

The technology described herein is not required to allow the user to choose the second method of authentication. Similarly, the technology described herein is not required to allow the user to choose the category of authentication within the soft authentication and hard authentication processes. Especially in the case of soft authentication, it is preferable to select information from the user's account without input from the user for generating the security questions. In the instance whereby the user's account contains four different categories of information—contact information, sent email, received email and account activity—it is preferable to randomly select the category of information that the security question(s) will be based upon each time the user is required to soft authenticate. By doing so, it will be impossible for an unauthorized third party to anticipate the type of information that will be required to answer to gain access to the user's landing page.

Figure 3:
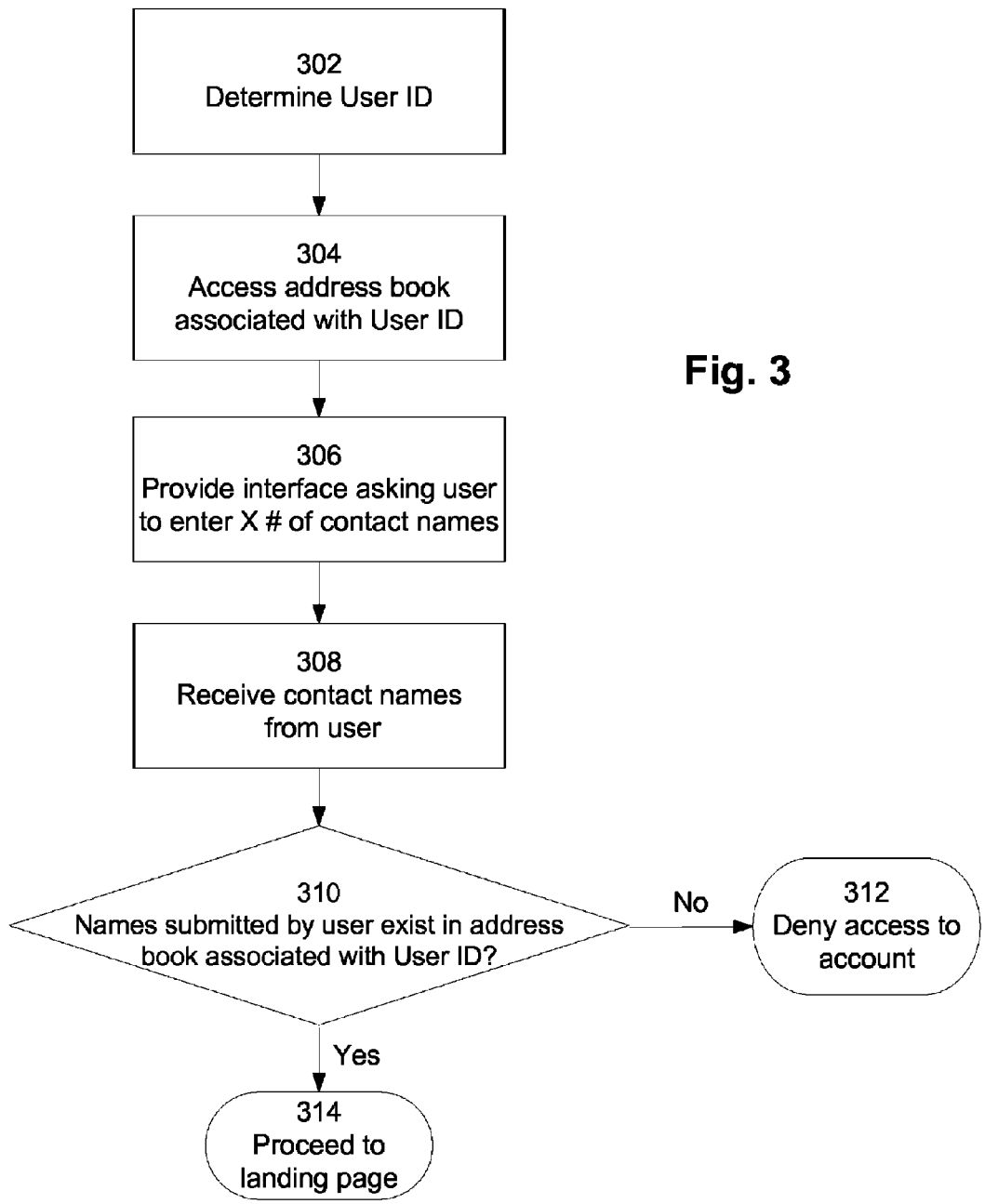
FIG. 3 depicts a flow diagram illustrating exemplary steps for soft authenticating a user based on contact names provided by the user.

As discussed above, the security question(s) may be based on any category of user information contained in the user's account. FIG. 3 illustrates exemplary steps for performing one embodiment of soft authentication whereby the system has chosen to authenticate the user based on contact names stored in the user's address book (e.g., address book 814 in FIG. 8). In step 302, the user ID is obtained. Because the user successfully authenticated a first time (step 116 in FIG. 1), the user ID can be easily obtained. In step 304, the address book associated with the user ID is accessed.

In step 306, a second authentication UI (see FIG. 11) is presented to the user requesting that the user enter three contact names from their contact list. The UI may ask a user to enter any number of contact names. The UI 1100 shown in FIG. 11 includes a display window 1102 displaying three contact fields 1104, 1106, 1108. Upon entering a contact name in each field, the user selects the verify button 1110.

In step 308, the contact names entered in fields 1104, 1106, 1108 by the user are received. In step 310, it is determined if all three names submitted by the user are located in the user's address book (address book associated with the user ID). If all three contacts entered by the user in fields 1104, 1106, 1108 are not located in the address book associated with the user ID, access to the account's landing page is denied to the user, in step 312. If the three contact names entered by the user in fields 104, 106, 108 are located in the address book associated with the user ID, the user is directed to the account's landing page, in step 314.

In the case where the address book is selected as the source of information for the soft authentication, any information contained in the address book may be used to verify the user. The information that can be used to authenticate a user is not limited to contact names. The information the user is required to enter into the fields 1104, 1106, 1108 could be information contained in any contact field in the address book, such as the company_field, the business_phone_number field, home_phone_number field, address field, email field, and so on. Upon the user entering the information in the fields 1104, 1106, 1108 and selecting the verify button 1110, the contact list associated with the user ID is searched for the information contained in the fields 1104, 1106, 1108 and the user is verified only if the information exists in the address book.

Figure 4:
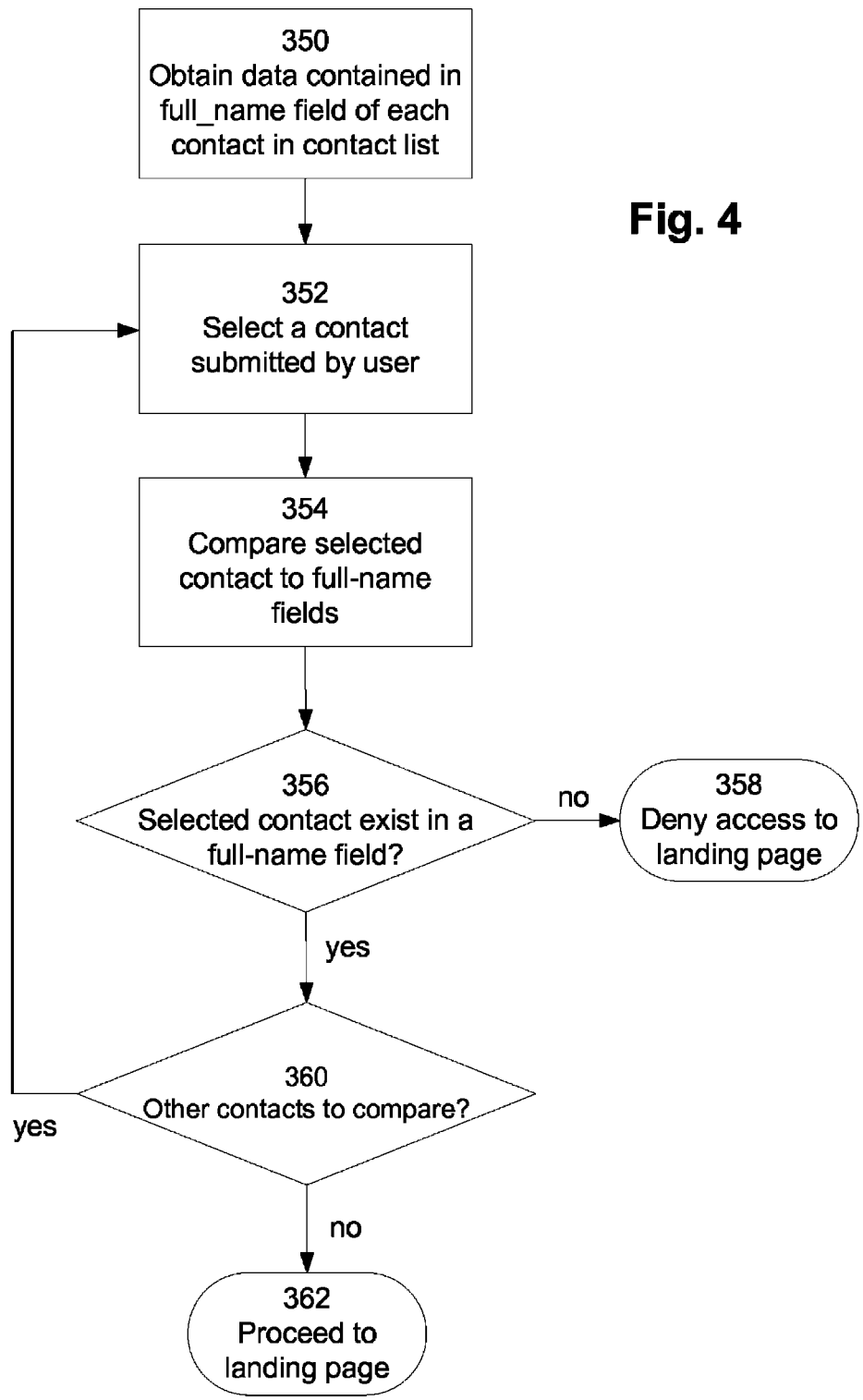
FIG. 4 depicts a flow diagram illustrating exemplary steps for verifying information provided during the soft authentication process shown in FIG. 3.

FIG. 4 provides additional detail of step 310 in FIG. 3. In step 350, data is obtained from the full_name field of each contact in the user's address book. Using the example whereby the user submitted three contacts, a first contact is selected, in step 352. The first contact name is compared against the full_name field data obtained in step 350. In step 356, it is determined whether a match was found. If the contact name submitted by the user did not match any of the names obtained from the full_name fields in the user's address book, access to the account is denied, in step 358. If the contact name submitted by the user matches one of the names obtained from the full_name fields in the user's address book, the method proceeds to step 360.

The system verifies that each of the contacts submitted by the user exist in the user's address book. Thus, in step 360, it is determined whether another contact name has been submitted by the user and not yet verified. If the user submitted more than one contact name, steps 352-356 are repeated. If any of the contact names submitted by the user are not located in the user's address book, access to the account is denied. If all of the names submitted by the user are verified, access to the account is granted, in step 362 (e.g., proceed to landing page).

Figure 5:
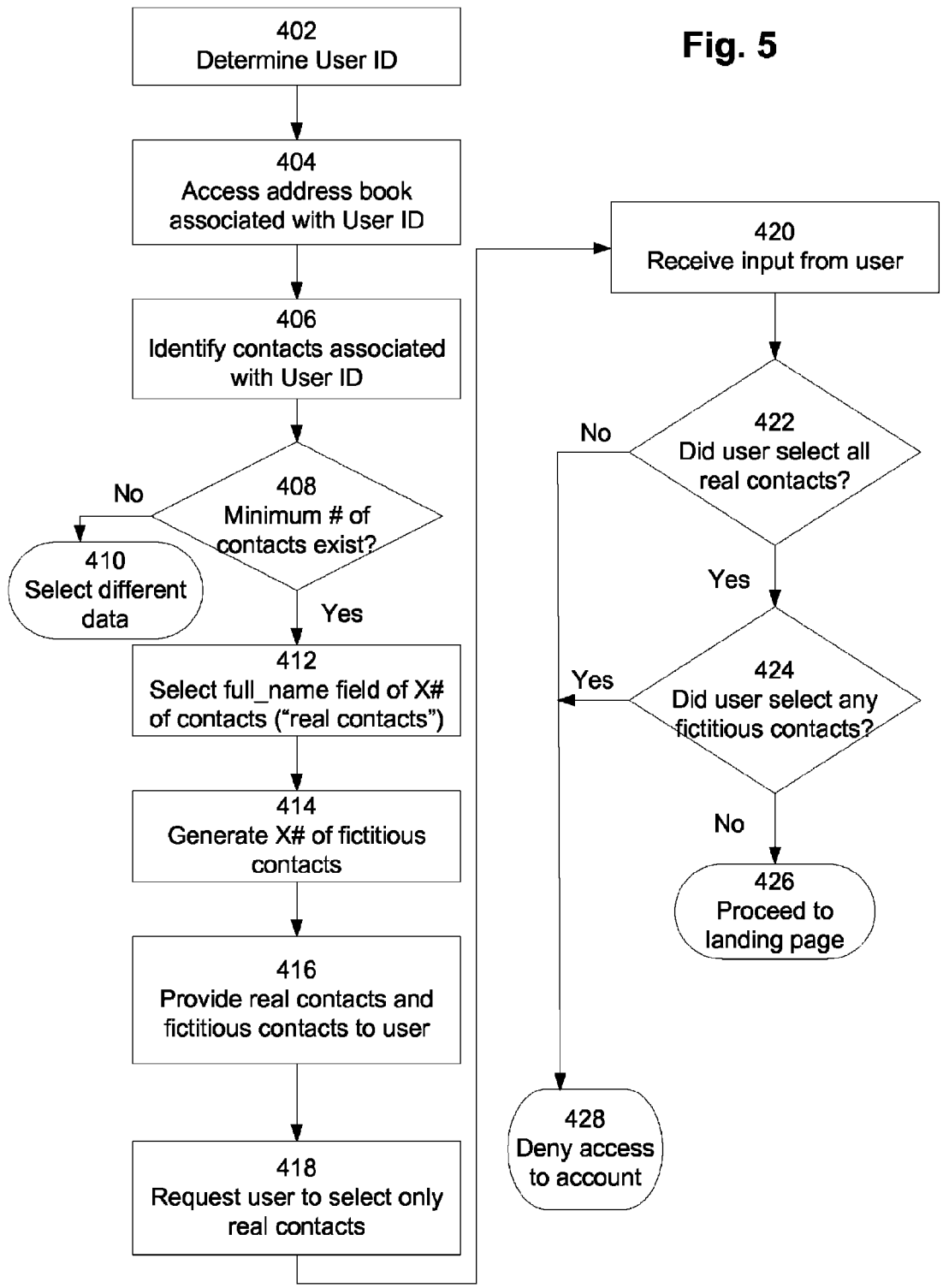
FIG. 5 depicts a flow diagram illustrating exemplary steps for providing a security question to the user based on contact names contained in the user's address book.

FIG. 5 illustrates exemplary steps of another embodiment of soft authentication whereby the system has chosen to authenticate the user based on contact names stored in the user's address book. In this embodiment however, the user is presented with a list of contact names and is asked to verify only the names retrieved from the user's address book.

In step 402, the user ID is determined. Using the example provided above, the user ID is joe@example.com. In step 404, the address book associated with joe@example.com is accessed. In step 406, the contact names (e.g., names in the full_name field) in the user's address book are identified. In one embodiment, it is preferable that the address book contain a minimum number of contact names so that the list of contact names provided to the user (step 416) contains more than one contact name retrieved from the user's address book. Thus, in step 408, it is determined whether a minimum number of contact names exist in the address book. Step 408 is not required. If a minimum number of contact names do not exist in the user's address book, the system will choose another category of information as the basis of the security question (e.g., calendar events, sent emails, received email, etc.), in step 410. If a minimum number of contact names exist, the method proceeds to step 412.

In step 412, the contact name contained in the full_name field is selected from a certain number of contact names in the user's address book. The number of contact names selected in step 412 is preferably random so that the soft authentication process does not become predictable (e.g., two contact names from user's address book are always presented in step 416). However, it is not required to randomly set the number of contact names. A contact name selected from a full_name field in the user's address book is referred to herein as a "real contact."

In step 414, fictitious contact names are generated. A fictitious contact is a contact name that does not exist in any full_name field of any contact in the user's address book. The number of fictitious name generated depends on the number of total contacts that will be presented to the user and how many "real contacts" were selected from the user's address book (step 412). In step 416, the real contacts and fictitious contacts are presented to the user.

Figure 12:
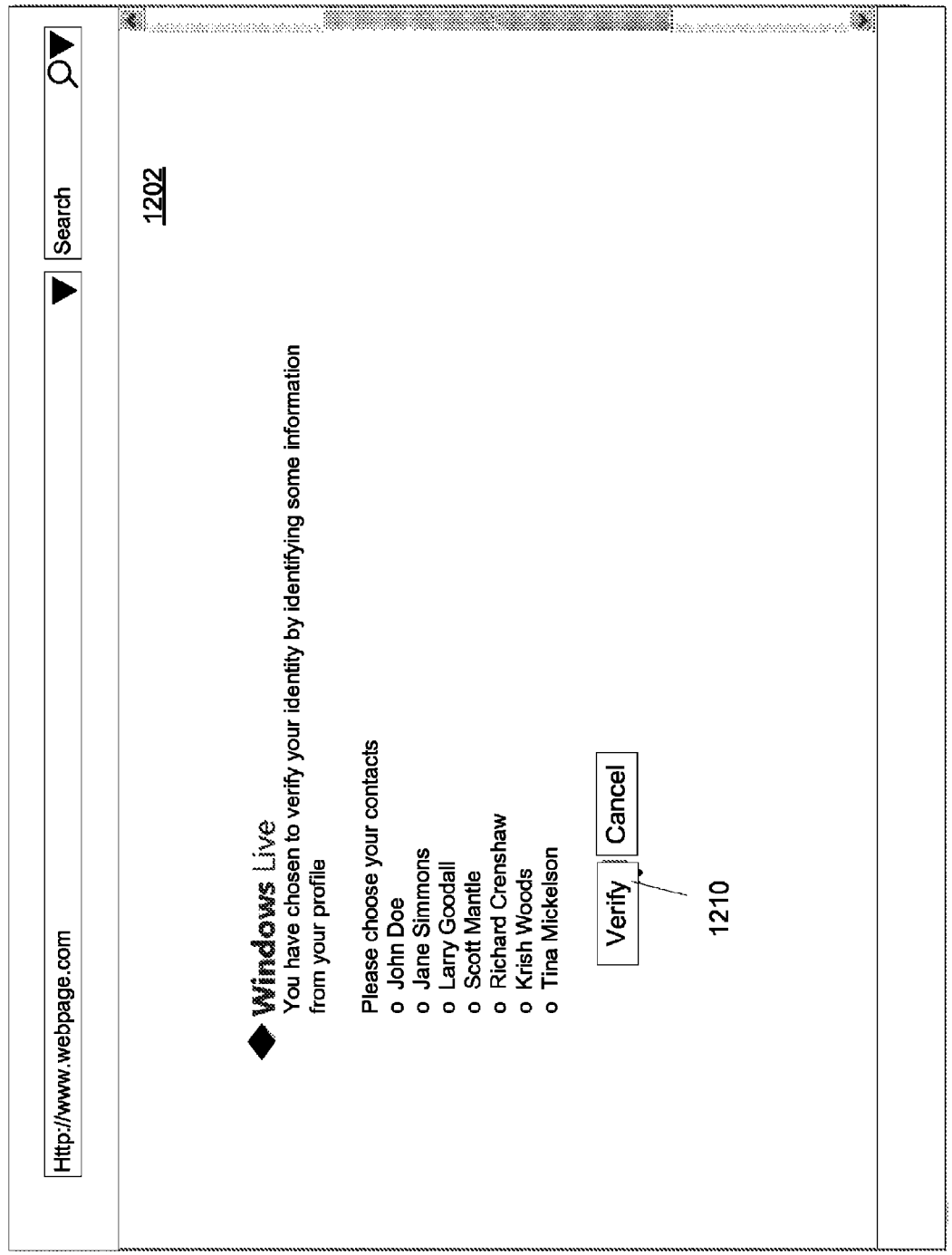
FIG. 12 illustrates an exemplary screen shot of a soft authentication interface providing a security question based on contact names obtained from the user's address book.

FIG. 12 provides one example of a soft authentication interface 1200. The interface 1200 displays seven contact names to the user. Suppose three real contacts were selected from the user's address book in step 412: John Doe, Krish Woods and Tina Mickelson. The other four contact names displayed in the window 1202 are fictitious contact names. None of the four fictitious contact names displayed in the interface 1202 are from the user's address book. Any number of real contacts may be selected from the user's address book and any number of fictitious contacts may be generated. It is also possible, for example, to not generate any fictitious contacts in step 414 and present only real contacts to the user in interface 1200. Similarly, it is possible to not select any real contacts from the user's address book and only provide fictitious contacts to the user in interface 1200.

In step 418, the user is requested to select only the real contacts. Using the FIG. 12 example, the user selects each real contact by clicking the icon adjacent the contact name. Upon selecting all of the real contacts, the user selects the verify button 1210. In step 422, the input from the user is received. In step 422, it is determined if the user selected all of the real contacts. If the user did not select all of the real contacts, access to the account is denied, in step 428. If the user did select all the real contacts, the method continues to step 424.

Selecting all the real contacts, by itself, is not sufficient to allow the user to proceed to the landing page. In step 424, it is determined whether the user selected any of the fictitious contacts. If the user selected any of the fictitious contacts, access to the account is denied, in step 428. If the user did not select any of the fictitious contacts, the user is allowed to proceed to the landing page, in step 426.

Alternatively, the technology could present a list of "real" contacts obtained from the user's address book, and ask the user to identify the contacts most recently added by the user. By doing so, the technology is not required to generate fictitious contacts. Each of the contacts presented to the user is a "real" contact.

Figure 6:
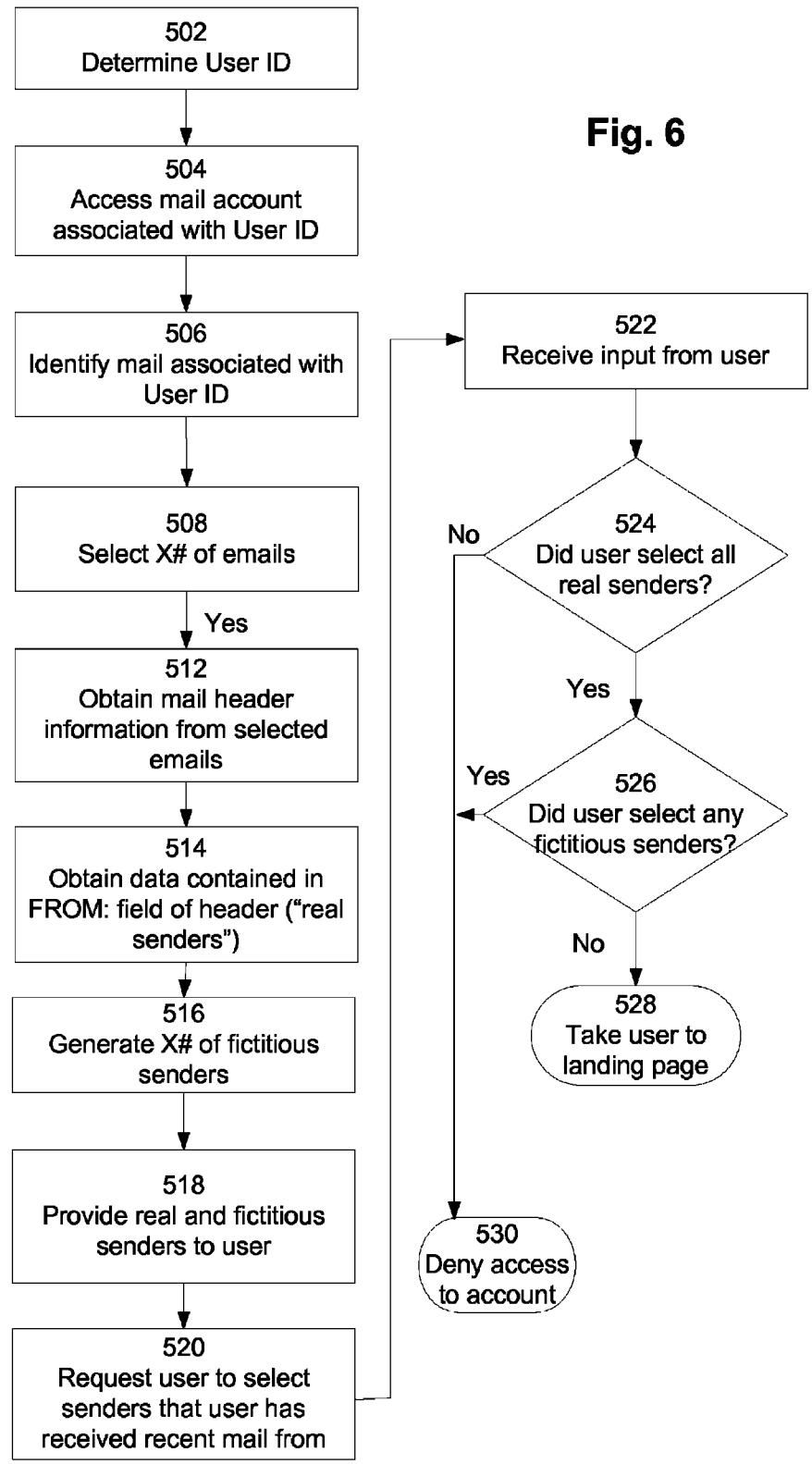
FIG. 6 depicts a flow diagram illustrating exemplary steps for providing a security question to the user based on electronic messages contained in the user's email account.

As discussed above, the soft authentication could also be based on email sent and/or received by the user via the user's account. FIG. 6 illustrates exemplary steps for authenticating the user based on information contained in the user's email account (e.g., email service 820 in FIG. 8). In step 502, the user ID is determined. In step 504, the mail account associated with the user ID is accessed. A typical mail account will contain email sent by the user (email stored in a sent folder) and email received by the user (email stored in an inbox folder). The security question(s) presented in the soft authentication may be based on information obtained from either email stored in the inbox folder or the sent folder. For the purpose of describing the technology herein only, the soft authentication steps shown in FIG. 6 are based on information obtained from email stored in the user's inbox folder.

In step 506, emails stored in the user's inbox folder are identified. These identified emails will serve as the basis for generating the security questions. As will be explained in more detail later, the soft authentication security questions should not be difficult for the user to answer. Thus, it is preferable to ask the user to verify recent information (e.g., recently received emails). However, the security questions can be based on any information contained in the user's account.

In step 508, the emails that will serve as the basis of the security question are selected. The number of emails selected in step 508 can be limited by setting a predetermined number of emails to identify (e.g., the last 50 emails received by the user), setting a date range (e.g., only select emails sent/received by the user within the last seven days), and so on. The number of emails selected in step 508 can, of course, be any number, including up to all of the emails contained in the sent or inbox folder.

In step 512, the information contained in the header fields of each email selected in step 508 is collected. Information contained in an email header field includes, but is not limited to a FROM: field, a TO: field, and a SUBJECT: field. A FROM: field typically contains an email address designating the sender's address (e.g., sender@example.com). A TO: field typically contains an email address designating the recipient's address (e.g., recipient@example.com). A SUBJECT: field typically contains text (e.g., "Hello from Sender").

In step 514, the information contained in the FROM: field of each selected email is obtained. These sender email addresses are referred to herein as "real senders." In step 516, a certain number of fictitious senders are generated. A fictitious sender is an email address that is not obtained from a FROM: field of any of the selected emails. Similar to the FIG. 4 description, the number of fictitious senders generated in step 516 depends on the number of real senders selected in step 514 and the total number of senders displayed to the user in the interface.

In step 518, the real senders and fictitious senders are displayed to the user in the interface. Similar to the interface 1200, the sender's email addresses may be displayed in a list format with an icon adjacent it for the user to select. This display format is for exemplary purposes only. The senders may be displayed in the interface in other formats. In step 520, the user is requested to select the senders that the user has recently received email from. Using the interface 1200 shown in FIG. 12, the user selects a box adjacent one or more senders and selects the verify button. In step 522, the input from the user is received indicating which senders the user selected.

In step 524, it is determined if the user selected all of the real senders. If the user did not select all of the real senders, access to the account is denied, in step 530. If the user selected all the real senders, the method continues to step 526.

Selecting all the real senders in the list of senders is not, by itself, sufficient to allow the user to proceed to the landing page. In step 526, it is determined whether the user selected any of the fictitious senders. If the user selected any of the fictitious senders, access to the account is denied, in step 530. If the user did not select any of the fictitious senders, the user is allowed to proceed to the landing page, in step 528.

Alternatively, the technology could present the text from several SUBJECT: fields of emails contained in the user's account and ask the user to identify the SUBJECT: fields of emails that the user has recently received. By doing so, the technology is not required to generate fictitious data. All of the text presented to the user is "real" data.

Figure 7:
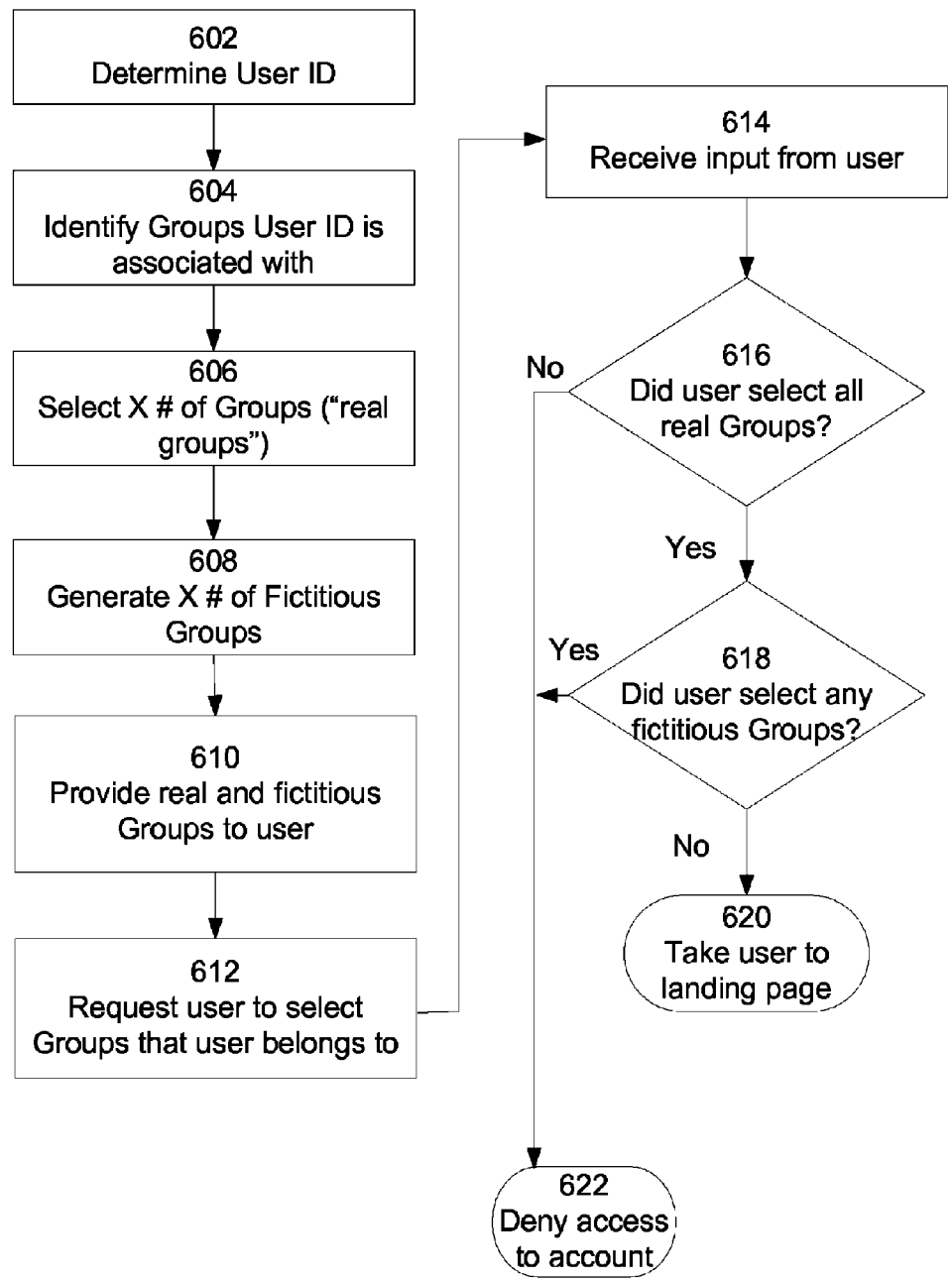
FIG. 7 depicts a flow diagram illustrating exemplary steps for providing a security question to the user based on group affiliations associated with the user.

FIG. 7 illustrates exemplary steps for soft authenticating the user based on security questions using group affiliation information contained in the user's account. In step 602, the user ID is determined. Based on the user ID, the group affiliations associated with the user ID are identified, in step 604.

In step 606, a certain number of the groups affiliated with the user ID are selected. The selected groups are referred to herein as "real groups." In step 608, a certain number of fictitious groups are generated. A fictitious group is a group name, generated by the system, that is not affiliated with the user's account. The number of real groups selected and fictitious groups generated depends on how many groups will be displayed to the user in the soft authentication page. If, for example, ten groups will be displayed to the user and three real groups were selected in step 606, seven fictitious groups would be generated in step 608.

In step 610, the real groups and fictitious groups are presented to the user for selection. The real groups and fictitious groups may be presented to the user in any order. In step 612, the user is requested to select only the real groups displayed in the interface (not shown). Similar to the FIG. 12 interface, the user selects the real Groups and then selects the verify button. In step 614, the Groups selected by the user are received.

In step 616, it is determined if the user selected all of the real Groups displayed in the interface. If the user did not select all of the real Groups, access to the account is denied, in step 622. If the user selected all the real Groups, the method continues to step 618.

Selecting all the real Groups displayed in the interface is not sufficient, by itself, to allow the user to proceed to the landing page. In step 618, it is determined whether the user selected any of the fictitious Groups displayed in the interface. If the user selected any of the fictitious Groups, access to the account is denied, in step 622. If the user did not select any of the fictitious Groups, the user is allowed to proceed to the landing page, in step 620.

Another category of user information that may be used to authenticate a user is account activity. Account activity associated with the user ID is stored similar to the other categories of information associated with the user ID. Account activity may include geographical locations from which the user account associated with the user ID has previously been accessed from (e.g., Redmond, Wash., Dallas, Tex., etc.). Alternatively, account activity may indicate the types of devices that have previously accessed the user account associated with the user ID (e.g., home computer, mobile device, etc.). Similar to FIGS. 4-7, a user may be asked to enter recent locations that the user has accessed their account from and the user will be authenticated based on the provided locations. Alternatively, the technology may provide a list of "real" and fictitious geographical locations to the user and authenticate the user based on input received form the user.

Figure 8:
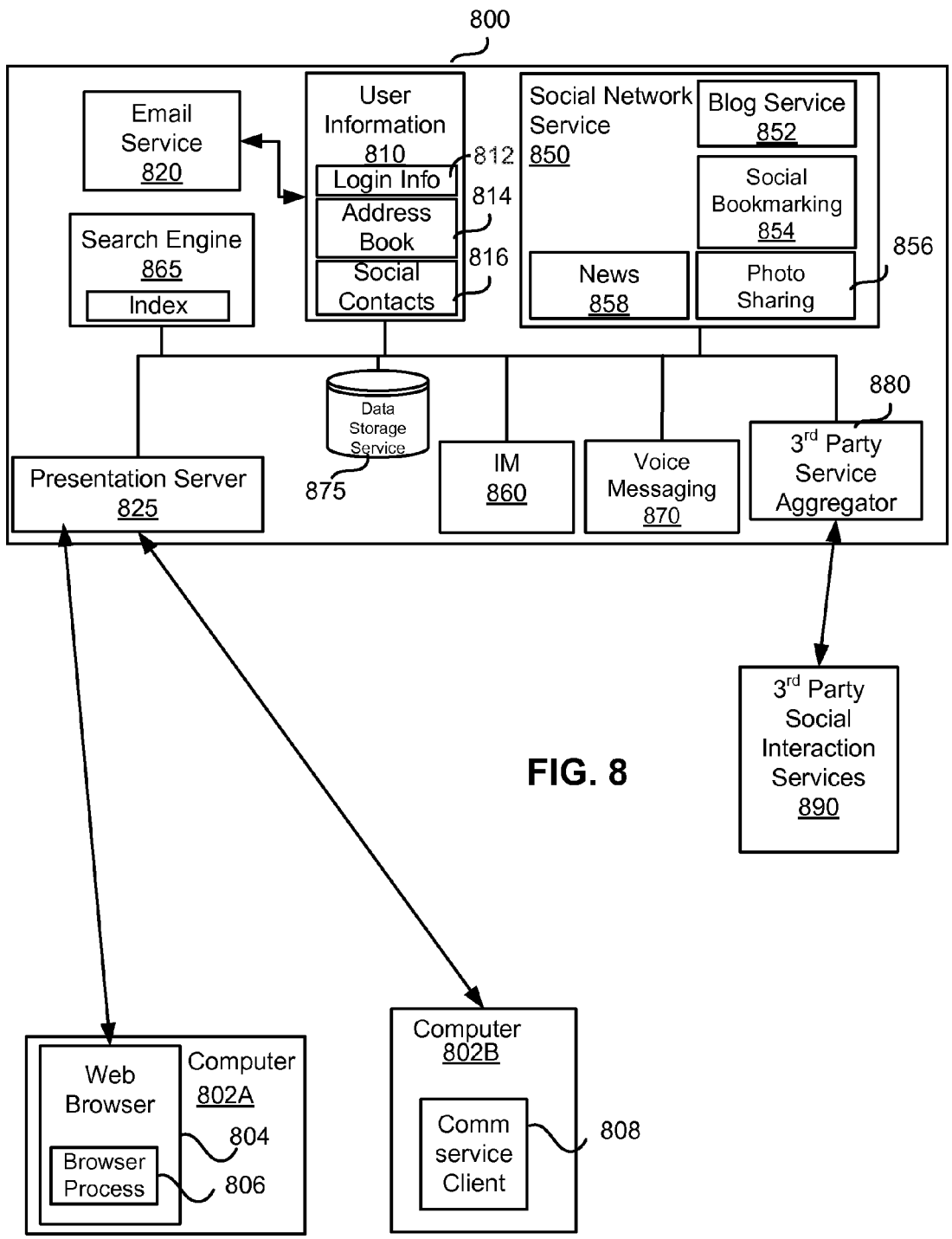
FIG. 8 is a block diagram illustrating a system for providing the information that is the basis for the security question presented during soft authentication in accordance with the present technology.

FIG. 8 illustrates an exemplary web service system 800 for implementing the technology presented herein. A web service 800 may include a number of different communication services including, for example, an e-mail service 820, an instant messaging service 860, a voice communication service 870, and a social networking service 850. In order to utilize the communication services provided by the web service provider 800, users create user accounts with a user information service 810.

The user information service records log-in information 812 for the user, and creates a data store associated with the user in a data storage service 875. The user information service will maintain the log-in information 812, and associate it with the user, address book 814, and a social contact book 816. The address book 814 can maintain contact information for individuals with whom the user wishes to communicate with, but for whom the user does not generally identify as a "friend". The social contact service 816 maintains a list of the user's "friends" with whom the user communicates using other services provided by the social networking service 850. A separate "buddy list" (not shown) is maintained for services with whom the user interacts via the instant messaging service 860. The voice messaging service 870 can use contact information from the buddy list, the address list, or the social contacts to provide voice communications between members and others. A search engine service which indexes some or all of the user content within the service 800 may also be provided.

The social networking service 850 provided by the web service 800 may include a web blogging service 852, a social bookmarking service 854, a photo sharing service 856, and a news service 858. The blog service 852 allows users to write personal and social commentary which may be presented to both friends, and the public at large. A social bookmarking service 854 allows users to share an interesting web link that the user thinks friends might find interesting. A photo sharing service 856 allows users to share both public and private photos which have been uploaded to the data store 875 with friends and with public. A news service 858 allows users to post status messages which inform their friends of their current activities and planned activities.

Users interact with the web service 200 via computers 802A or 802B. Computers 802A and 802B communicate with, for example, a presentation server 825. The presentation server 825 may, in one embodiment, comprise a web server which provides one or more pages and/or web-based applications to a web browser 804 executing a browser process on computer 802A. Alternatively, a dedicated communication service client 808 (such as in instant messaging or VOIP client) may operate on a computer (802B) and communicate with the presentation server, or with one of the services provided by the web service 800 directly. Communication with the presentation server 825 may occur via one or more public and private networks, such as the Internet.

Also shown as a component of web service 800 is a third-party social network service aggregator 880. A third-party service social network service aggregator 880 incorporates information provided by third party social network services 890. Many social networking services provide application programming interfaces (APIs) which allow data to be extracted from the social networking service, or themselves provide information streams, such as, for example, RSS feeds, which allow information to be published from the service and incorporated into other presentation or social networking services. The third-party service aggregator 880 can extract information from third-party networking services or receive the information feed which may then be presented to the user via the presentation service through the social networking service 850. This information can also be used by the service provider 800 to in conjunction with friend recommendations as discussed herein.

FIGS. 4-7 provide examples of a soft authentication based on contact names, email and Group affiliations. Soft authentication is not limited to these categories of information. As discussed above, any information contained in the user's account, or that is accessible from the user's account, may be used to generate security questions. Using the FIG. 8 example of information available in a user's account, a security question generated for a soft authentication process may be based on, by way of example only, information from the address book 814, social contacts 816, blog service 852, social bookmarking service 854, photo sharing service 856, news service 858, IM 860, voice messaging 870 or third party service aggregator 880. The services shown in FIG. 8 are not intended to limit the scope of the technology described herein.

Figure 9:
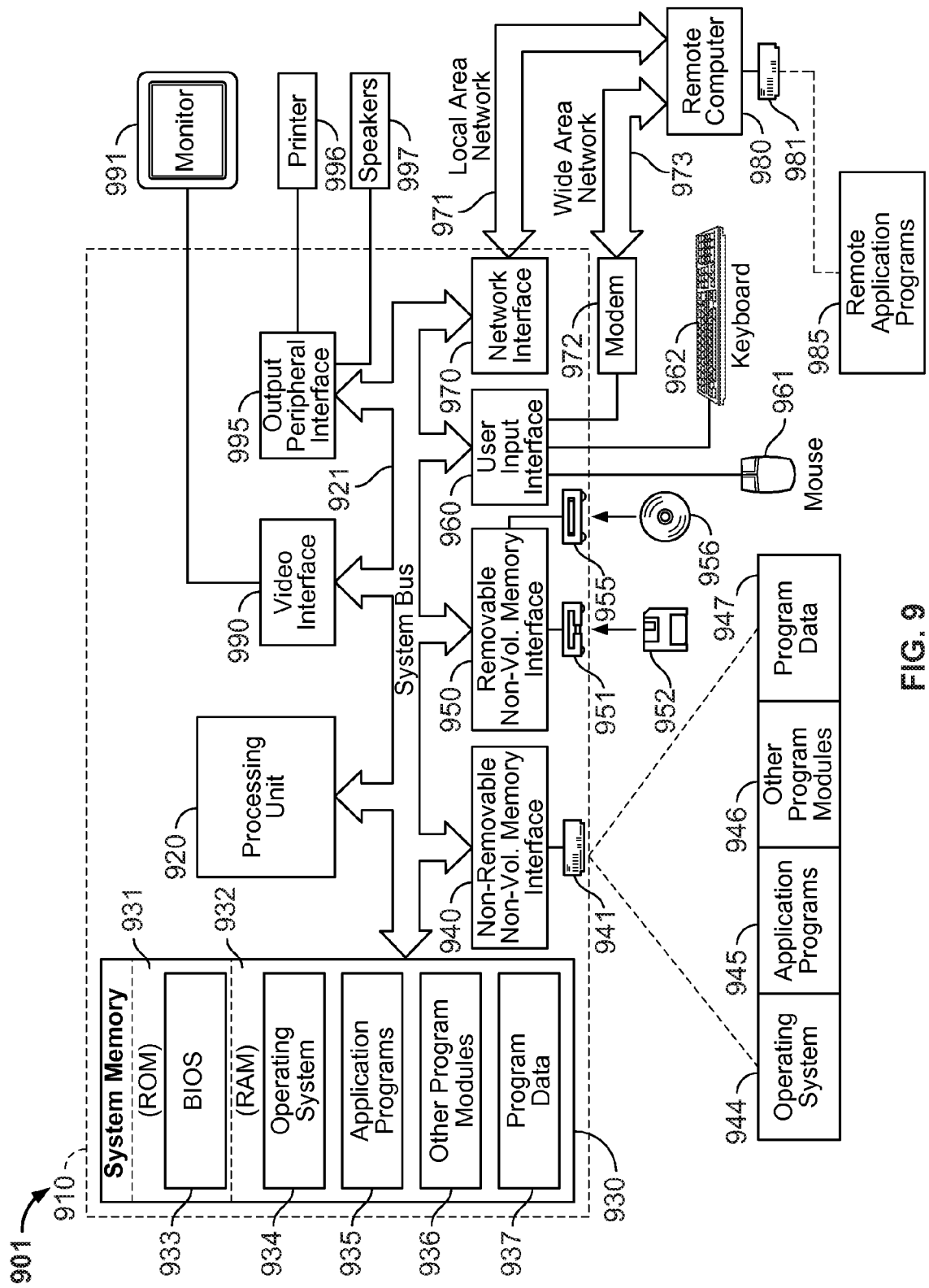
FIG. 9 depicts a schematic diagram of an exemplary computer system for implementing the methods and generating the screen shots described herein.

With reference to FIG. 9, an exemplary system for implementing the inventive system includes a general purpose computing device in the form of a computer 910. Components of computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 910 may include a variety of computer readable media. Computer readable media can be any available media that can be accessed by computer 910 and includes both volatile and nonvolatile media, removable and non-removable media. By way of example, and not limitation, computer readable media may comprise computer storage media and communication media. Computer storage media includes volatile and nonvolatile, as well as removable and non-removable media implemented in any method or technology for storage of information such as computer readable instructions, data structures, program modules or other data. Computer storage media includes, but is not limited to, random access memory (RAM), read only memory (ROM), EEPROM, flash memory or other memory technology, CD-ROMs, digital versatile discs (DVDs) or other optical disc storage, magnetic cassettes, magnetic tapes, magnetic disc storage or other magnetic storage devices, or any other medium which can be used to store the desired information and which can be accessed by computer 910. Communication media typically embodies computer readable instructions, data structures, program modules or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as radio frequency and other wireless media. Combinations of any of the above are also included within the scope of computer readable media.

The system memory 930 includes computer storage media in the form of volatile and/or nonvolatile memory such as ROM 931 and RAM 932. A basic input/output system (BIOS) 933, containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 8 illustrates operating system 934, application programs 935, other program modules 936, and program data 937.

The computer 910 may also include other removable/non-removable, volatile/nonvolatile computer storage media. By way of example only, FIG. 8 illustrates a hard disc drive 941 that reads from or writes to non-removable, nonvolatile magnetic media and a magnetic disc drive 951 that reads from or writes to a removable, nonvolatile magnetic disc 952. Computer 910 may further include an optical media reading device 955 to read and/or write to an optical media.

Other removable/non-removable, volatile/nonvolatile computer storage media that can be used in the exemplary operating environment include, but are not limited to, magnetic tape cassettes, flash memory cards, DVDs, digital video tapes, solid state RAM, solid state ROM, and the like. The hard disc drive 941 is typically connected to the system bus 921 through a non-removable memory interface such as interface 940. Magnetic disc drive 951 and optical media reading device 955 are typically connected to the system bus 921 by a removable memory interface, such as interface 950.

The drives and their associated computer storage media discussed above and illustrated in FIG. 8, provide storage of computer readable instructions, data structures, program modules and other data for the computer 910. In FIG. 8, for example, hard disc drive 941 is illustrated as storing operating system 944, application programs 945, other program modules 946, and program data 947. These components can either be the same as or different from operating system 934, application programs 935, other program modules 936, and program data 937. Operating system 944, application programs 945, other program modules 946, and program data 947 are given different numbers here to illustrate that, at a minimum, they are different copies.

A user may enter commands and information into the computer 910 through input devices such as a keyboard 962 and a pointing device 961, commonly referred to as a mouse, trackball or touch pad. Other input devices (not shown) may include a microphone, joystick, game pad, satellite dish, scanner, or the like. These and other input devices are often connected to the processing unit 920 through a user input interface 960 that is coupled to the system bus 921, but may be connected by other interface and bus structures, such as a parallel port, game port or a universal serial bus (USB). A monitor 991 or other type of display device is also connected to the system bus 921 via an interface, such as a video interface 990. In addition to the monitor, computers may also include other peripheral output devices such as speakers 997 and printer 996, which may be connected through an output peripheral interface 995.

The computer 910 may operate in a networked environment using logical connections to one or more remote computers, such as a remote computer 980. The remote computer 980 may be a personal computer, a server, a router, a network PC, a peer device or other common network node, and typically includes many or all of the elements described above relative to the computer 910, although only a memory storage device 981 has been illustrated in FIG. 8. The logical connections depicted in FIG. 9 include a local area network (LAN) 971 and a wide area network (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communication over the WAN 973, such as the Internet. The modem 972, which may be internal or external, may be connected to the system bus 921 via the user input interface 960, or other appropriate mechanism. In a networked environment, program modules depicted relative to the computer 910, or portions thereof, may be stored in the remote memory storage device. By way of example, and not limitation, FIG. 8 illustrates remote application programs 985 as residing on memory device 981. It will be appreciated that the network connections shown are exemplary and other means of establishing a communication link between the computers may be used.

The subject matter of the present technology is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. In addition, it is assumed that one skilled in the art is familiar with details pertaining to television signal detection, and so such details are omitted herein for purposes of clarity.

While the present technology has been described in connection with the embodiments of the various figures, it is to be understood that other similar embodiments may be used or modifications and additions may be made to the described embodiment for performing the same function of the present technology without deviating therefrom. Therefore, the present technology should not be limited to any single embodiment, but rather should be construed in breadth and scope in accordance with the appended claims.

We claim:

1. A method for authenticating a user prior to providing access to a user's account, the user's account being accessible via a sign-in page upon verifying a user's credentials, comprising:

determining that a device is accessing the sign-in page;
obtaining an identifier associated with the device accessing the sign-in page;
determining that the identifier associated with the device accessing the sign-in page is not associated with a trusted device;
identifying personal information data of at least one person other than the user contained in the user's account wherein the personal information data of the at least one person other than the user contained in the user's account includes at least one of the following: a sender email address for at least one person other than the user as a sender, a recipient email address for at least one person other than the user as a recipient, contact information for at least one person other than the user stored in an address book, and a calendar invitee associated with a calendar event;
upon verifying the user's credentials, generating at least one security question based on the personal information data of the at least one person other than the user randomly selected from the user's account wherein the step of generating at least one security question comprises the steps of:
accessing the address book;
selecting at least one contact name for at least one person other than the user from the address book;
generating at least one fictitious contact name;
presenting the at least one contact name for at least one person other than the user selected from the address book and the at least one fictitious contact name to the user via an interface; and
requesting the user to select only the at least one contact name for at least one person other than the user selected from the address book; and providing the at least one security question to the user via a user interface, wherein the user is required to correctly answer the at least one security question in order to access the user's account.

2. The method as recited in claim 1, wherein the step of obtaining an identifier associated with a device comprises:
   obtaining an internet protocol address associated with the device accessing the sign-in page.

3. The method as recited in claim 1, wherein the step of obtaining an identifier associated with a device comprises the step of:
   obtaining a device identification associated with the device accessing the sign-in page.

4. The method as recited in claim 1, wherein the step of obtaining an identifier associated with a device comprises the step of:
   determining a geographical location associated with the device accessing the sign-in page.

5. The method as recited in claim 2, wherein the step of determining that the identifier associated with the device accessing the sign-in page is not associated with a trusted device comprises the steps of:
   accessing a known bot database, wherein the known bot database contains a list of internet protocol addresses that have been associated with a bot;
   comparing the internet protocol address associated with the device accessing the sign-in page with the list contained in the know bot database; and
   determining that the internet protocol address associated with the device accessing the sign-in page is located on the list.

6. The method as recited in claim 2, wherein the step of determining that the identifier associated with the device accessing the sign-in page is not associated with a trusted device comprises the steps of:
   accessing a database containing internet protocol addresses associated with devices that have been associated with successfully accessing the user's account;
   comparing the internet protocol address associated with the device accessing the sign-in page with the internet protocol addresses contained in the database; and
   determining that the internet protocol address associated with the device accessing the sign-in page is not located in the trusted device database.

7. The method as recited in claim 1, further comprising:
   if the security question is answered incorrectly, limiting access to the user's account.

8. The method of claim 7 wherein limiting the access to the user's account further comprises granting read-only access to the user.

9. A method for authenticating a user prior to providing access to a user's account, the user's account being accessible via a sign-in page upon verifying a user's credentials, comprising:
   determining that a device is accessing the sign-in page;
   obtaining an identifier associated with the device accessing the sign-in page;
   determining that the identifier associated with the device accessing the sign-in page is not associated with a trusted device;
   identifying personal information data of at least one person other than the user contained in the user's account wherein the personal information data of the at least one person other than the user contained in the user's account includes at least one of the following: a sender email address for at least one person other than the user as a sender, a recipient email address for at least one person other than the user as a recipient, contact information for at least one person other than the user stored in an address book, and a calendar invitee associated with a calendar event;
   upon verifying the user's credentials, generating at least one security question based on the personal information data of the at least one person other than the user randomly selected from the user's account wherein the step of generating at least one security question comprises the steps of:
      accessing electronic messages received by the user, wherein each electronic message received by the user includes a header containing a sender name of at least one person other than the user and a subject line;
      selecting at least one electronic message received by the user;
      obtaining the subject line from the header of each of the at least one selected electronic messages;
      generating at least one fictitious subject line;
      presenting the subject line obtained from the header of each of the selected electronic messages and the subject line from each one of the at least one fictitious subject lines to the user; and
      requesting the user to select only the subject lines from electronic message actually received by the user; and
   providing the at least one security question to the user via a user interface, wherein the user is required to correctly answer the at least one security question in order to access the user's account.

10. The method of claim 9 wherein obtaining an identifier associated with the device accessing the sign-in page further comprises
   obtaining at least one of the following identifiers associated with the device accessing the sign-in page: Internet Protocol address, device identification, geographical location, subnet, network access identifier, and autonomous system number.

11. The method of claim 10 determining that the identifier associated with the device accessing the sign-in page is not associated with a trusted device further comprises
   identifying the Internet Protocol address associated with the device accessing the sign-in page;
   accessing a database containing Internet Protocol addresses previously associated with the user's account;
   comparing the Internet Protocol address associated with the device accessing the sign-in page with the Internet Protocol addresses contained in the database; and
   determining that the Internet Protocol address associated with the device accessing the sign-in page is not located in the database.

* * * * *